(12) United States Patent
Gandhi

(10) Patent No.: US 11,610,563 B2
(45) Date of Patent: Mar. 21, 2023

(54) LOCATION-BASED DISPLAY OF PIXEL HISTORY

(71) Applicant: eBay Inc., San Jose, CA (US)

(72) Inventor: Saumil Ashvin Gandhi, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 112 days.

(21) Appl. No.: 17/308,647

(22) Filed: May 5, 2021

(65) Prior Publication Data

US 2021/0256939 A1   Aug. 19, 2021

Related U.S. Application Data

(63) Continuation of application No. 16/921,559, filed on Jul. 6, 2020, now Pat. No. 11,030,978, which is a continuation of application No. 16/670,820, filed on Oct. 31, 2019, now Pat. No. 10,748,508, which is a continuation of application No. 16/232,918, filed on Dec. 26, 2018, now Pat. No. 10,504,491, which is a continuation of application No. 15/446,532, filed on Mar. 1, 2017, now Pat. No. 10,192,526, which is a
(Continued)

(51) Int. Cl.
G09G 5/377 (2006.01)
G06T 11/60 (2006.01)
G06F 3/14 (2006.01)

(52) U.S. Cl.
CPC .............. *G09G 5/377* (2013.01); *G06T 11/60* (2013.01); *G06F 3/14* (2013.01); *G09G 2370/027* (2013.01); *G09G 2370/04* (2013.01); *G09G 2370/20* (2013.01)

(58) Field of Classification Search
None
See application file for complete search history.

(56) References Cited

U.S. PATENT DOCUMENTS

| 5,963,964 A | 10/1999 | Nielsen |
| 6,366,933 B1 | 4/2002 | Ball et al. |
| 7,266,510 B1 | 9/2007 | Cofino et al. |
(Continued)

FOREIGN PATENT DOCUMENTS

| CN | 102270331 A | 12/2011 |
| CN | 102521317 A | 6/2012 |
(Continued)

OTHER PUBLICATIONS

US 10,375,176 B2, 08/2019, Sundaresan (withdrawn)
(Continued)

*Primary Examiner* — James A Thompson
(74) *Attorney, Agent, or Firm* — FIG. 1 Patents

(57) ABSTRACT

A screen is presented on a display of a user device, which includes an element occupying less than an entirety of the screen. A second screen is then presented on the display, which includes a second element occupying less than an entirety of the second screen. The user device receives an input that requests that a previously presented element be presented within the second screen next to enable comparison of the previously presented element with the second element. The user device presents, on the display of the user device and responsive to receiving the input, a contemporaneous view of the element next to the second element within the second screen.

20 Claims, 10 Drawing Sheets

Related U.S. Application Data continuation of application No. 13/407,417, filed on Feb. 28, 2012, now Pat. No. 9,589,541.

(56) References Cited

U.S. PATENT DOCUMENTS

| | | |
|---|---|---|
| 7,614,004 B2 | 11/2009 | Milic et al. |
| 7,788,583 B1 | 8/2010 | Amzallag et al. |
| 7,899,829 B1 | 3/2011 | Malla |
| 8,166,406 B1 | 4/2012 | Goldfeder et al. |
| 8,533,594 B2 | 9/2013 | Grossman et al. |
| 8,533,595 B2 | 9/2013 | Grossman et al. |
| 8,600,784 B1 | 12/2013 | Ivey et al. |
| 8,631,029 B1 | 1/2014 | Amacker |
| 8,739,044 B1 | 5/2014 | Varadarajan |
| 8,856,039 B1 | 10/2014 | Talreja et al. |
| 9,092,405 B1 * | 7/2015 | Hayden ............... G06F 40/197 |
| 9,549,028 B2 | 1/2017 | Sundaresan |
| 9,589,541 B2 | 3/2017 | Gandhi |
| 9,740,777 B2 | 8/2017 | Carrillo et al. |
| 9,912,756 B2 | 3/2018 | Sundaresan |
| 10,192,526 B2 | 1/2019 | Gandhi |
| 10,504,491 B2 | 12/2019 | Gandhi |
| 10,601,929 B2 | 3/2020 | Sundaresan |
| 10,606,905 B2 | 3/2020 | Carrillo et al. |
| 10,748,508 B2 | 8/2020 | Gandhi |
| 10,771,567 B2 | 9/2020 | Sundaresan |
| 11,030,978 B2 | 6/2021 | Gandhi |
| 2003/0080986 A1 | 5/2003 | Baird |
| 2003/0195963 A1 | 10/2003 | Song et al. |
| 2004/0254844 A1 | 12/2004 | Torres |
| 2005/0066037 A1 | 3/2005 | Song et al. |
| 2005/0132296 A1 | 6/2005 | Milic-frayling et al. |
| 2006/0031774 A1 | 2/2006 | Gaudette |
| 2006/0224997 A1 | 10/2006 | Wong et al. |
| 2006/0248200 A1 | 11/2006 | Stanev |
| 2007/0022385 A1 | 1/2007 | Denissov |
| 2008/0040484 A1 | 2/2008 | Yardley |
| 2008/0201650 A1 | 8/2008 | Lemay et al. |
| 2008/0288362 A1 | 11/2008 | King |
| 2009/0024946 A1 | 1/2009 | Gotz |
| 2009/0089267 A1 | 4/2009 | Chi et al. |
| 2009/0132516 A1 | 5/2009 | Patel et al. |
| 2009/0172582 A1 | 7/2009 | Miyawaki et al. |
| 2009/0265255 A1 | 10/2009 | Jackson et al. |
| 2010/0005097 A1 | 1/2010 | Liang et al. |
| 2010/0048167 A1 | 2/2010 | Chow et al. |
| 2010/0050068 A1 | 2/2010 | Usami |
| 2010/0082637 A1 | 4/2010 | Mishne et al. |
| 2010/0306171 A1 | 12/2010 | Antos et al. |
| 2010/0325357 A1 | 12/2010 | Reddy et al. |
| 2011/0213678 A1 | 9/2011 | Chorney |
| 2011/0289459 A1 | 11/2011 | Athans et al. |
| 2012/0066602 A1 | 3/2012 | Chai et al. |
| 2012/0072821 A1 | 3/2012 | Bowling |
| 2012/0081375 A1 | 4/2012 | Robert et al. |
| 2012/0092277 A1 | 4/2012 | Momchilov |
| 2012/0094644 A1 | 4/2012 | Hayashi et al. |
| 2012/0159379 A1 | 6/2012 | Negrillo et al. |
| 2012/0185762 A1 | 7/2012 | Ozer et al. |
| 2012/0216102 A1 | 8/2012 | Malla |
| 2012/0216124 A1 | 8/2012 | Martino et al. |
| 2012/0240050 A1 | 9/2012 | Goldfeder et al. |
| 2012/0272192 A1 | 10/2012 | Grossman et al. |
| 2013/0021369 A1 | 1/2013 | Denney et al. |
| 2013/0050224 A1 | 2/2013 | Gehani et al. |
| 2013/0076598 A1 | 3/2013 | Sirpal et al. |
| 2013/0101101 A1 | 4/2013 | Waghmare et al. |
| 2013/0222429 A1 | 8/2013 | Gandhi |
| 2013/0231146 A1 | 9/2013 | Mathias et al. |
| 2013/0232113 A1 | 9/2013 | Liang et al. |
| 2013/0304590 A1 | 11/2013 | Motenko et al. |
| 2014/0129455 A1 | 5/2014 | Davidson |
| 2014/0289598 A1 | 9/2014 | Charitos |
| 2014/0359735 A1 | 12/2014 | Lehmann et al. |
| 2015/0007100 A1 | 1/2015 | Wang et al. |
| 2015/0154686 A1 | 6/2015 | Lawrence et al. |
| 2015/0177934 A1 | 6/2015 | Carrillo et al. |
| 2015/0193851 A1 | 7/2015 | Hua et al. |
| 2015/0237147 A1 | 8/2015 | Sundaresan |
| 2016/0188146 A1 | 6/2016 | Tian |
| 2017/0126813 A1 | 5/2017 | Sundaresan |
| 2017/0178598 A1 | 6/2017 | Gandhi |
| 2017/0316093 A1 | 11/2017 | Carrillo et al. |
| 2018/0152520 A1 | 5/2018 | Sundaresan |
| 2019/0130877 A1 | 5/2019 | Gandhi |
| 2019/0320026 A1 | 10/2019 | Sundaresan |
| 2020/0066235 A1 | 2/2020 | Gandhi |
| 2020/0183987 A1 | 6/2020 | Carrillo et al. |
| 2020/0335066 A1 | 10/2020 | Gandhi |
| 2020/0351356 A1 | 11/2020 | Sundaresan |

FOREIGN PATENT DOCUMENTS

| | | |
|---|---|---|
| CN | 105874450 A | 8/2016 |
| CN | 106164822 A | 11/2016 |
| JP | 2005-242760 A | 9/2005 |
| JP | 2006-243861 A | 9/2006 |
| JP | 2011-034295 A | 2/2011 |
| JP | 2011-159113 A | 8/2011 |
| JP | 2011-159281 A | 8/2011 |
| JP | 2012-146028 A | 8/2012 |
| JP | 2013-120603 A | 6/2013 |
| KR | 10-1913920 B1 | 10/2018 |
| WO | 2002/025466 A2 | 3/2002 |
| WO | 2007/116705 A1 | 10/2007 |
| WO | 2013/105128 A1 | 7/2013 |
| WO | 2015/095519 A1 | 6/2015 |
| WO | 2015/126835 A1 | 8/2015 |

OTHER PUBLICATIONS

US 10,440,126 B2, 10/2019, Sundaresan (withdrawn)

Sandaram,"How-To: Save and Restore Your Browsing History in Firefox", Retrieved from the Internet URL: <http://echawakening_org/how-to-save-history-in-firefox/915/, May 9, 2018, 5 pages.

Zhang et al., "Enhancing Dynamic-Viewport Mobile Applications with Screen Scrolling", Journal of Latex Class Files, vol. 14, Aug. 8, 2015, pp. 1-15.

Office Action received for Korean Patent Application No. 10-2016-7019698, dated Aug. 9, 2017, 11 pages (5 pages of English Translation and 6 pages of Official Copy).

Notice of Allowance received for Korean Patent Application No. 10-2018-7013182, dated Dec. 21, 2018, 3 pages (2 Pages of Official Copy and 1 Page of English Translation).

Office Action received for Korean Patent Application No. 10-2018-7013182, dated Jun. 19, 2018, 4 pages (2 pages of English Translation and 2 pages of Official Copy).

Final Office Action received for U.S. Appl. No. 13/407,417, dated Apr. 10, 2015, 18 pages.

Final Office Action received for U.S. Appl. No. 13/407,417, dated Jun. 28, 2016, 19 pages.

Final Office Action received for U.S. Appl. No. 13/407,417, dated May 7, 2014, 15 pages.

Non-Final Office Action received for U.S. Appl. No. 13/407,417, dated Nov. 3, 2015, 16 pages.

Non-Final Office Action received for U.S. Appl. No. 13/407,417, dated Sep. 12, 2013, 11 pages.

Non-Final Office Action received for U.S. Appl. No. 13/407,417, dated Sep. 18, 2014, 18 pages.

Notice of Allowance received for U.S. Appl. No. 13/407,417, dated Oct. 25, 2016, 8 pages.

Corrected Notice of Allowability received for U.S. Appl. No. 14/137,085, dated Jul. 20, 2017, 2 pages.

Final Office Action received for U.S. Appl. No. 14/137,085, dated Aug. 11, 2016, 21 pages.

Non-Final Office Action received for U.S. Appl. No. 14/137,085, dated Jan. 21, 2016, 19 pages.

Notice of Allowance received for U.S. Appl. No. 14/137,085, dated Jan. 13, 2017, 20 pages.

(56) References Cited

OTHER PUBLICATIONS

Extended European Search Report received for European Patent Application No. 14871877.8 dated Jan. 23, 2017, 13 pages.
Non-Final Office Action received for U.S. Appl. No. 15/446,532, dated Jul. 14, 2017, 17 pages.
Non-Final Office Action received for U.S. Appl. No. 15/446,532, dated Mar. 30, 2017, 5 pages.
Non-Final Office Action Received for U.S. Appl. No. 15/446,532 dated Apr. 10, 2018, 18 pages.
Notice of allowance received for U.S. Appl. No. 15/446,532, dated Sep. 13, 2018, 6 pages.
First Action Interview Pre-Interview Communication received for U.S. Appl. No. 15/655,522, dated Jun. 24, 2019, 8 pages.
First Action Interview—Office Action Summary received for U.S. Appl. No. 15/655,522, dated Jul. 18, 2019, 9 pages.
Notice of Allowance received for U.S. Appl. No. 15/655,522, dated Nov. 25, 2019, 13 pages.
Non-Final Office Action received for U.S. Appl. No. 16/232,918, dated May 23, 2019, 14 pages.
Notice of Allowance received for U.S. Appl. No. 16/232,918, dated Sep. 17, 2019, 8 pages.
Non Final Office Action Received for U.S. Appl. No. 16/670,820, dated Nov. 27, 2019, 16 pages.
Notice of Allowance received for U.S. Appl. No. 16/670,820, dated Jun. 25, 2020, 8 pages.
Notice of Allowance received for U.S. Appl. No. 16/670,820, dated Mar. 18, 2020, 9 Pages.
International Preliminary Report on Patentability received for PCT Application No. PCT/US2014/071155, dated Jun. 30, 2016, 8 pages.
International Search Report received for PCT Patent Application No. PCT/US2014/071155, dated Mar. 31, 2015, 2 pages.
International Written Opinion received for PCT Patent Application No. PCT/US2014/071155, dated Mar. 31, 2015, 6 pages.
Office Action received for Canadian Patent Application No. 2,933,580, dated Apr. 10, 2017, 5 pages.
First Examination Report Received for Australian Patent Application No. 2014364512 dated Nov. 30, 2016, 3 pages.
Decision of Rejection Received for Chinese Patent Application No. 201480069762.5, dated Oct. 12, 2019, 18 pages (6 pages of official copy and 12 pages of English translation).
Office Action received for Chinese Patent Application No. 201480069762.5, dated Feb. 19, 2019, 21 pages (8 pages of Official Copy and 13 pages of English Translation).
Office Action received for Chinese Patent Application No. 201480069762.5, dated Sep. 6, 2018, 23 pages (9 Pages of Official Copy and 14 pages of English Translation).
Anonymous,"Save Session", Firefox Add-ons, Retrieved from the Internet: URL:http://web.archive.org/web/20111205042616/https://addons.mozilla.org/de/firefox/addon/save-session, Jul. 21, 2009, 2 pages.
U.S. Appl. No. 16/921,559, filed Jul. 6, 2020, Patented.
U.S. Appl. No. 16/670,820, filed Oct. 31, 2019, Patented.
U.S. Appl. No. 16/232,918, filed Dec. 26, 2018, Patented.
U.S. Appl. No. 15/446,532, filed Mar. 1, 2017, Patented.
U.S. Appl. No. 13/407,417, filed Feb. 28, 2012, Patented.
Notice of Acceptance Received for Australian Patent Application No. 2014364512 dated Jun. 1, 2017, 3 pages.
Notice of Allowance Received for Korean Patent Application No. 10-2016-7019698, dated Feb. 9, 2018, 3 pages (2 Pages of Official Copy & 1 page of English Translation).
Non Final Office Action Received for U.S. Appl. No. 16/792,756, dated Jun. 8, 2021, 43 Pages.
Non-Final Office Action received for U.S. Appl. No. 16/921,559, dated Dec. 16, 2020, 19 Pages.
Notice of Allowance Received for U.S. Appl. No. 16/921,559, dated Mar. 10, 2021, 8 Pages.
Re-Examination Notification Received for Chinese Patent Application No. 201480069762.5, dated Apr. 29, 2021, 14 Pages (1 Page of English translation and 13 Pages of Official Copy).
U.S. Appl. No. 16/792,756 , "Non-final Office Action received for U.S. Appl. No. 16/792,756, dated Feb. 8, 2022", dated Feb. 8, 2022, 53 Pages.
Final Office Action Received for U.S. Appl. No. 16/792,756, dated Nov. 8, 2021, 43 Pages.
Decision of Reexamination Received for Chinese Patent Application No. 201480069762.5, dated Jul. 29, 2021, 21 Pages (2 Pages of English Translation & 19 Pages of Official Copy).
U.S. Appl. No. 16/792,756, "Notice of Allowance", U.S. Appl. No. 16/792,756, filed Jul. 21, 2022, 11 pages.

* cited by examiner

LOCATION-BASED DISPLAY OF PIXEL HISTORY

PRIORITY

This application is a continuation of and claims priority to U.S. patent application Ser. No. 16/921,559 filed on Jul. 6, 2020, which is a continuation of U.S. patent application Ser. No. 16/670,820 filed on Oct. 31, 2019, which is a continuation of, U.S. patent application Ser. No. 16/232,918, filed on Dec. 26, 2018, which is a continuation of, and claims priority to, U.S. patent application Ser. No. 15/446,532, filed on Mar. 1, 2017, which is a continuation of, and claims priority to, U.S. patent application Ser. No. 13/407,417, filed on Feb. 28, 2012, the disclosures of which are hereby incorporated by reference in their entireties.

TECHNICAL FIELD

The subject matter disclosed herein generally relates to the processing of data. Specifically, the present disclosure addresses systems and methods of facilitating location-based display of pixel history.

BACKGROUND

The presentation of modern graphics on a display (e.g., electronic device or monitor) often involves displaying a sequence (e.g., a series) of "screens" on the display. For example, an electronic display monitor (e.g., with a cathode ray tube or a plasma flat-panel display) may display a rectangular arrangement of pixels, any one or more of which may change as each screen is displayed. A display may present one screen at a particular time and present another screen at another particular time. Accordingly, a current screen may be presented at a current time (e.g., now), while a previous screen may have been presented at a previous time (e.g., one minute ago or a day ago).

BRIEF DESCRIPTION OF THE DRAWINGS

Some embodiments are illustrated by way of example and not limitation in the figures of the accompanying drawings.

DETAILED DESCRIPTION

Figure 1:
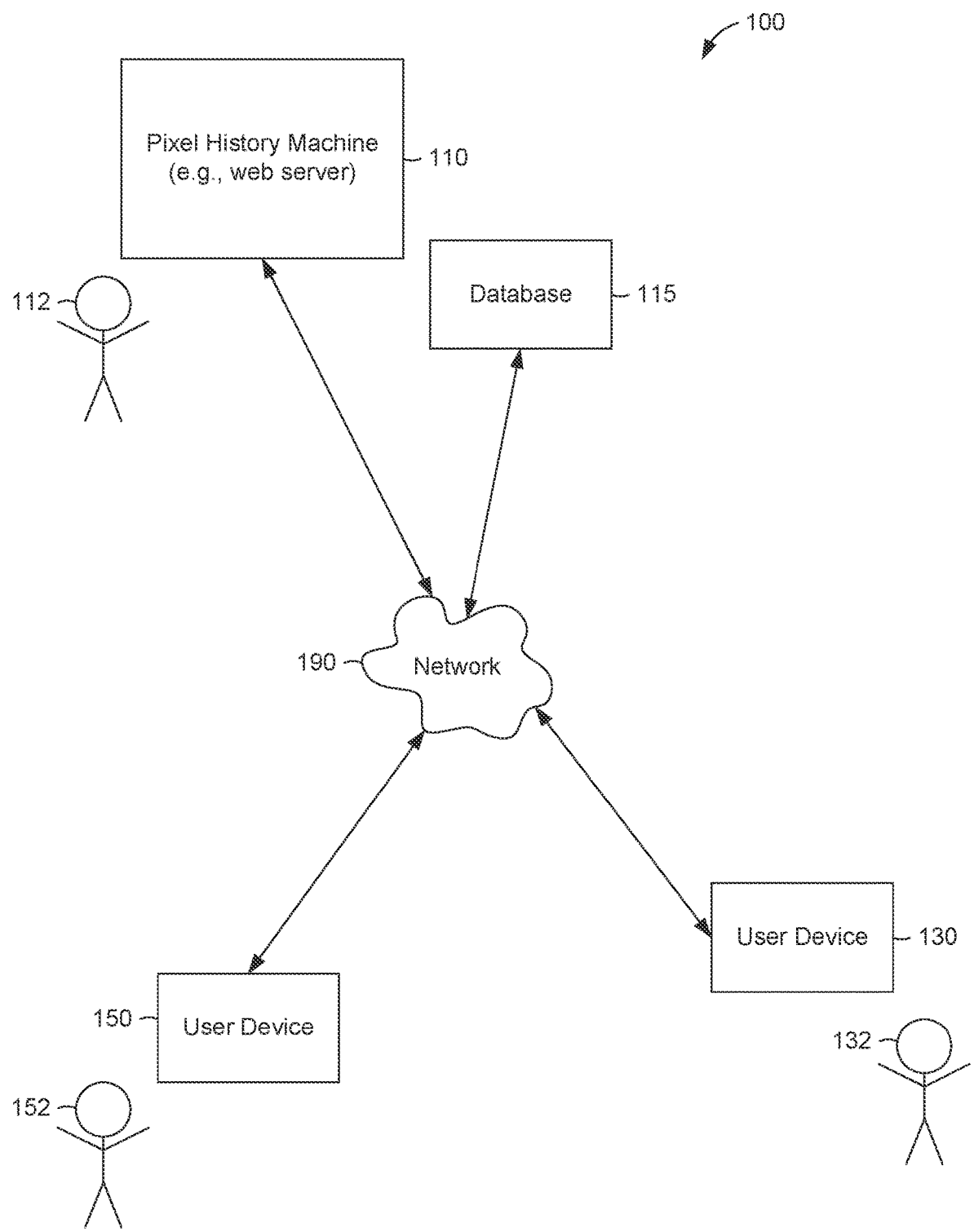
FIG. 1 is a network diagram illustrating a network environment suitable for location-based display of pixel history, according to some example embodiments.

Example methods and systems are directed to location-based display of pixel history. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A pixel history machine (e.g., with a processor) may include a display and may be configured (e.g., by software) to receive one or more locations as a definition of an area for a portion of a screen. For example, the pixel history machine may receive (e.g., from a user, via a user interface) coordinates of one or more corners of the display, where these corners define the area encompassed by the portion of the screen. Once defined by location, the area may be stored as a portion of a screen. This may be performed by the pixel history machine for each screen presented on the display. Accordingly, the pixel history machine may present (e.g., on the display) a first screen (e.g., a previous screen) with a first portion (e.g., a previous portion) of the first screen, and the pixel history machine may store the first portion (e.g., in a memory buffer, such as a browser cache).

The pixel history machine may be configured to present (e.g., on the display) a second screen (e.g., a current screen) with a second portion (e.g., a current portion) of the second screen. For example, the display of the pixel history machine may be cleared of the first screen and refreshed (e.g., repainted or redrawn) with the second screen in the course of displaying a sequence of multiple screens. An example of a sequence of multiple screens being presented on the display is the individual frames of a motion picture (e.g., a movie or a video) being sequentially shown on the display (e.g., full screen, partial screen, or within a window of a user interface). Another example is a computer desktop (e.g., a background of a user interface, with or without one or more icons) being changed from one configuration (e.g., a particular background with a particular set of icons) to another configuration (e.g., a different background with a different set of icons). A further example is the contents of a window (e.g., of a graphical user interface) being cleared of existing content and refreshed with new content (e.g., a web browser application clearing a currently displayed webpage and displaying a new webpage).

The pixel history machine may be further configured to receive a request that the first portion (e.g., previous portion) of the first screen (e.g., previous screen) be presented within the second screen (e.g., current screen). For example, this request may take the form of a gesture being detected by the pixel history machine. Moreover, the gesture may identify the location of the area encompassed by the first and second portions. Examples of such gestures include a swipe over the second portion (e.g., current portion) of the second screen (e.g., current screen), a double tap or double click on the second portion of the second screen, or any suitable combination thereof. In response to this request, the pixel history machine may present the first portion of the first screen within (e.g., inside) the second screen (e.g., current screen). Presentation of the first portion may be performed with or without presentation of the second portion (e.g., current portion) of the second screen (e.g., current screen).

FIG. 1 is a network diagram illustrating a network environment 100 suitable for location-based display of pixel history, according to some example embodiments. The network environment 100 includes a pixel history machine 110, a database 115, and user devices 130 and 150, all communicatively coupled to each other via a network 190. The pixel history machine 110, the database 115, and the user devices 130 and 150 may each be implemented in a computer system, in whole or in part, as described below with respect to FIG. 10.

In some example embodiments, the pixel history machine 110 may be a web server, a document server, image server, or any suitable combination thereof. Certain example embodiments of the pixel history machine 110 include a machine executing an operating system (e.g., a system-level program or service) or an application (e.g., a software application). The pixel history machine 110 may be configured to present a sequence of multiple screens by communicating (e.g., providing) the sequence to one or more of the user devices 130 and 150. In alternative example embodiments, the pixel history machine 110 may be a graphical workstation, a personal computer, a user device (e.g., similar to the user devices 130 and 150), or any suitable combination thereof, and the pixel history machine 110 may be configured to present the sequence of multiple screens by displaying the sequence on a display (e.g., a monitor, flat-panel display, or touch screen) connected or communicatively coupled thereto.

The database 115 may form all or part of a memory buffer that is configured to store one or more portions of the sequence of multiple screens presented by the pixel history machine 110. In some example embodiments, the database 115 is incorporated into the pixel history machine 110 (e.g., as local storage).

Also shown in FIG. 1 are users 112, 132, and 152. One or more of the users 112, 132, and 152 may be a human user (e.g., a human being), a machine user (e.g., a computer configured by a software program to interact with the user device 130), or any suitable combination thereof (e.g., a human assisted by a machine or a machine supervised by a human). In example embodiments that include the user 112, the user 112 is not part of the network environment 100, but is associated with the pixel history machine 110. For example, the pixel history machine 110 may be a desktop computer, a vehicle computer, a tablet computer, a navigational device, a portable media device, or a smart phone belonging to the user 112. In example embodiments that include the user 132, the user 132 is not part of the network environment 100, but is associated with the user device 130 and may be a user of the device 130. For example, the user device 130 may be a desktop computer, a vehicle computer, a tablet computer, a navigational device, a portable media device, or a smart phone belonging to the user 132. Likewise, in example embodiments that include the user 152, the user 152 is not part of the network environment 100, but is associated with the user device 150. As an example, the user device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines illustrated in FIG. 1 may be combined into a single machine, and the functions described herein for any single machine may be subdivided among multiple machines.

The network 190 may be any network that enables communication between machines (e.g., pixel history machine 110 and the user device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
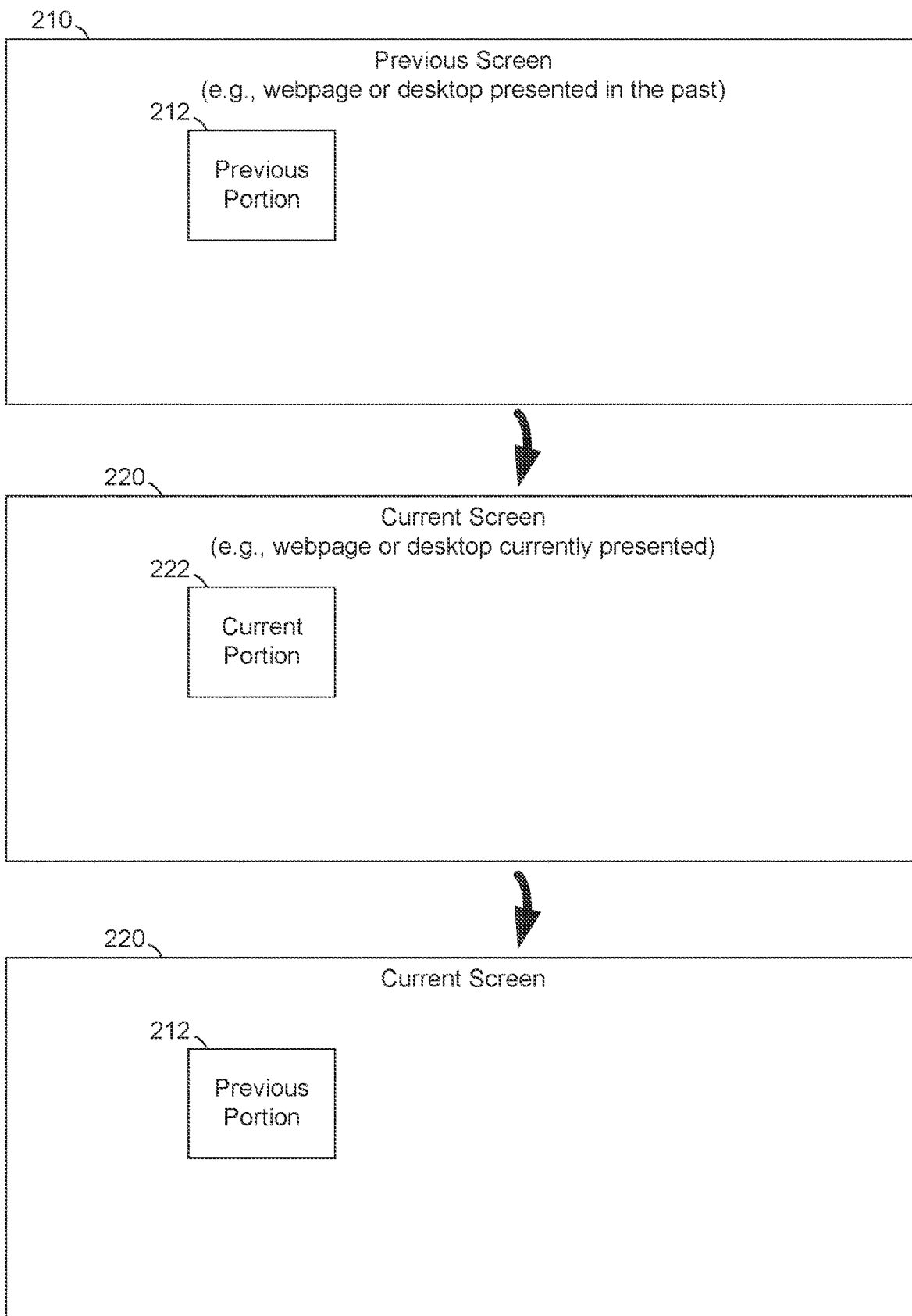
FIG. 2-5 are conceptual diagrams illustrating presentation of a previous screen prior to presentation of a current screen, and a subsequent presentation of a previous portion of the previous screen within the current screen, according to some example embodiments.

FIG. 2-5 are conceptual diagrams illustrating presentation of a previous screen 210 (e.g., a first screen) prior to presentation of a current screen 220 (e.g., a second screen), and a subsequent presentation of a previous portion 212 (e.g., a first portion) of the previous screen 210 within the current screen 220, according some example embodiments. As shown in FIG. 2, the previous screen 210 includes the previous portion 212. After presentation of the previous screen 210, the previous screen 210 is replaced (e.g., refreshed, redrawn, or repainted) with the current screen 220, as indicated by a curved arrow.

The current screen 220 is distinct from the previous screen 210, at least by virtue of a current portion 222 that is distinct from the previous portion 212. The current screen 220 includes the current portion 222 (e.g., a second portion). The current portion 222 of the current screen 220 may have the same location, the same dimensions, the same corners, the same area, or any suitable combination thereof, as the previous portion 212 of the previous screen 210. That is, the current portion 222 may be at a location (e.g., a particular location having a particular area with particular dimensions) within the current screen 220, and the previous portion 212 may be at the same location (e.g., the same particular location with the same particular area and dimensions) within the previous screen 210. In particular, the area of the previous portion 212 and the area of the current portion 222 may both be the product of the same pixel width (e.g., 320 pixels wide) and the same pixel height (e.g., 240 pixels high). Accordingly, the previous portion 212 and the current portion 222 may both have the same number of pixels (e.g., 76,800 pixels).

FIG. 2 depicts the previous portion 212 and the current portion 222 as rectangular regions of their respective screens. Such rectangular regions may be a size (e.g., small, medium, or large) in comparison to their respective screens. Moreover, according to various example embodiments, the previous portion 212, the current portion 222, or both, may be or include an image, an icon, a user-defined area (e.g., defined by the user 112 or the user 132), the user-defined number of pixels (e.g., defined by the user 112 for the user 132), or any suitable combination thereof.

As shown in FIG. 2, after presentation of the current screen 220 with the current portion 222, the previous portion 212 is presented within the current screen 220. FIG. 2 depicts the previous portion 212 as replacing the current portion 222 within the current screen 220. This is indicated by another curved arrow. Accordingly, the presentation of the previous portion 212 within the current screen 220 may have the effect of performing a location-based display of pixel history, where the previous portion 212 of the previous screen 210 includes historically presented pixels (e.g., previously displayed pixels) with respect to the current portion 222 of the current screen 220.

According to various example embodiments, the previous screen 210 and the current screen 220 may be webpages (e.g., entire webpages or any one or more portions thereof)

presented at different times, documents (e.g., pages or tables) displayed at different times, desktops (e.g., user interfaces with backgrounds and icons) presented at different times, individual movie or video frames presented at different times, or any suitable combination thereof.

Figure 3:
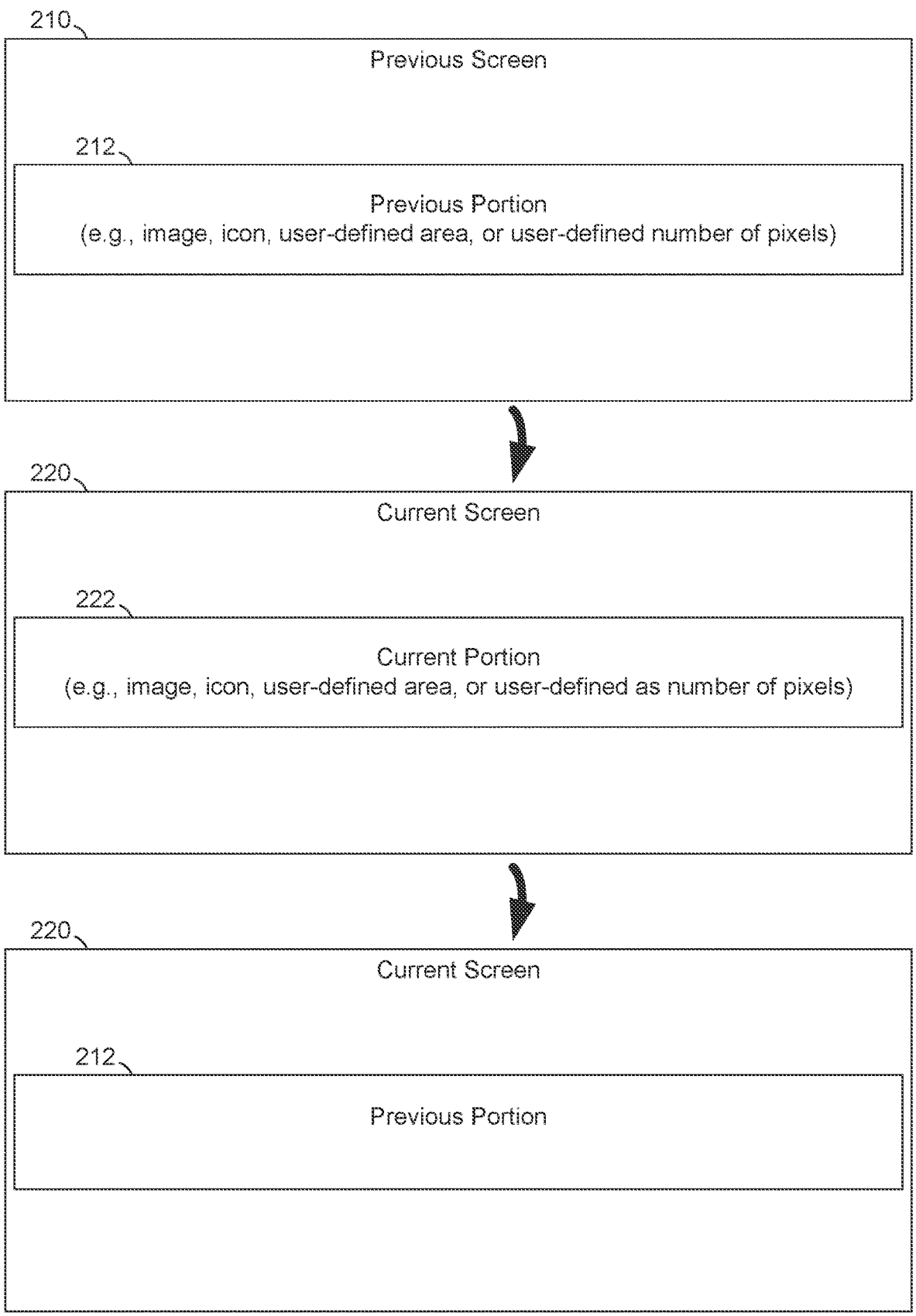

FIG. 3 depicts the previous portion 212 and the current portion 222 as areas encompassing one or more horizontal rows of pixels within their respective screens. In particular, FIG. 3 depicts the previous portion 212 and the current portion 222 as rectangular rows. In some example embodiments, the previous portion 212 and the current portion 222 stretch from the left edge to the right edge of their respective screens.

Figure 4:
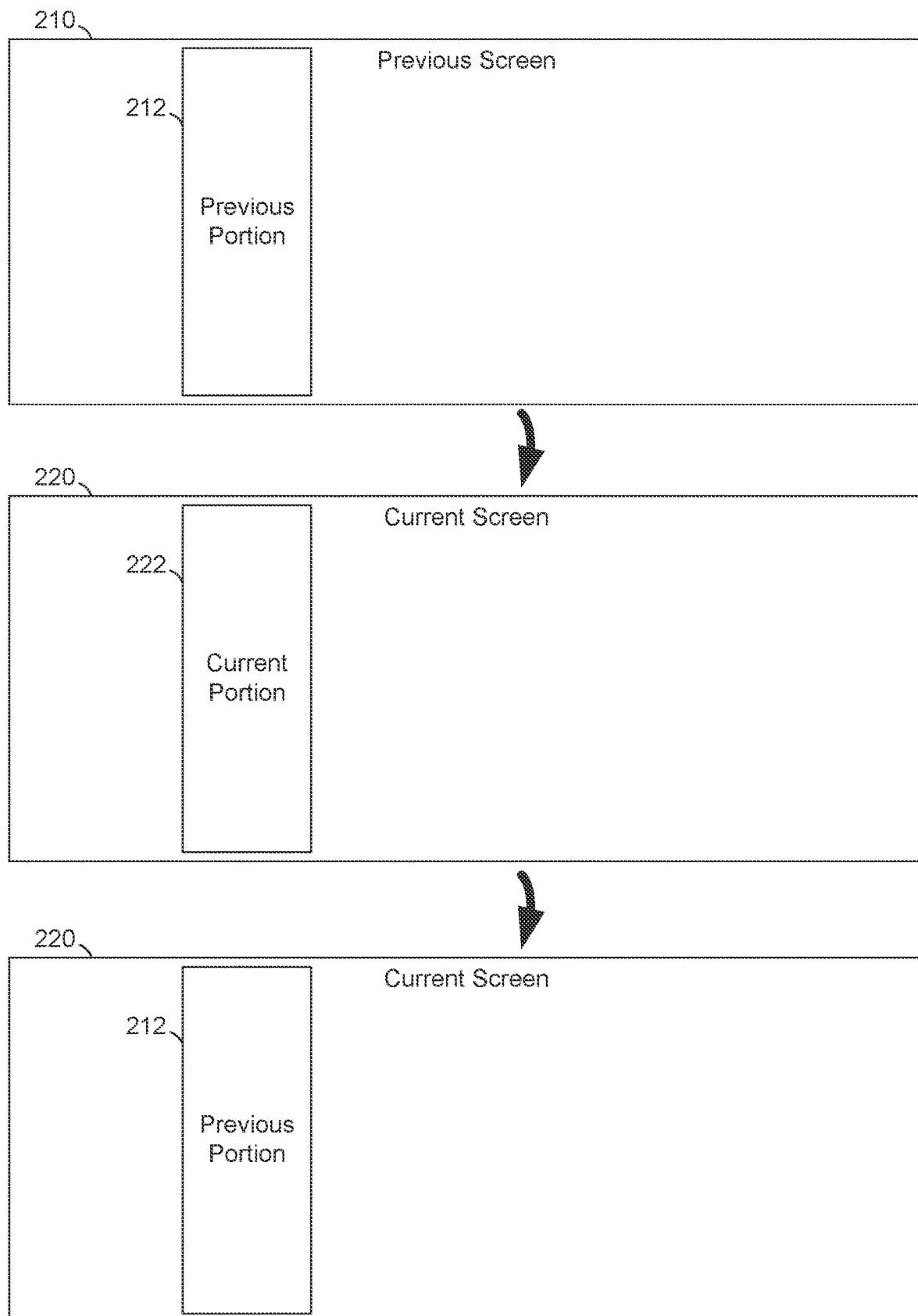

FIG. 4 depicts the previous portion 212 and the current portion 222 as areas encompassing one or more vertical columns of pixels within their respective screens. In particular, FIG. 4 depicts the previous portion 212 and the current portion 222 as rectangular columns. In some example embodiments, the previous portion 212 and the current portion 222 stretch from the top edge to the bottom edge of their respective screens. In general, the previous portion 212 and the current portion 222 may be of any shape or size and may be at any location on their respective screens.

Figure 5:
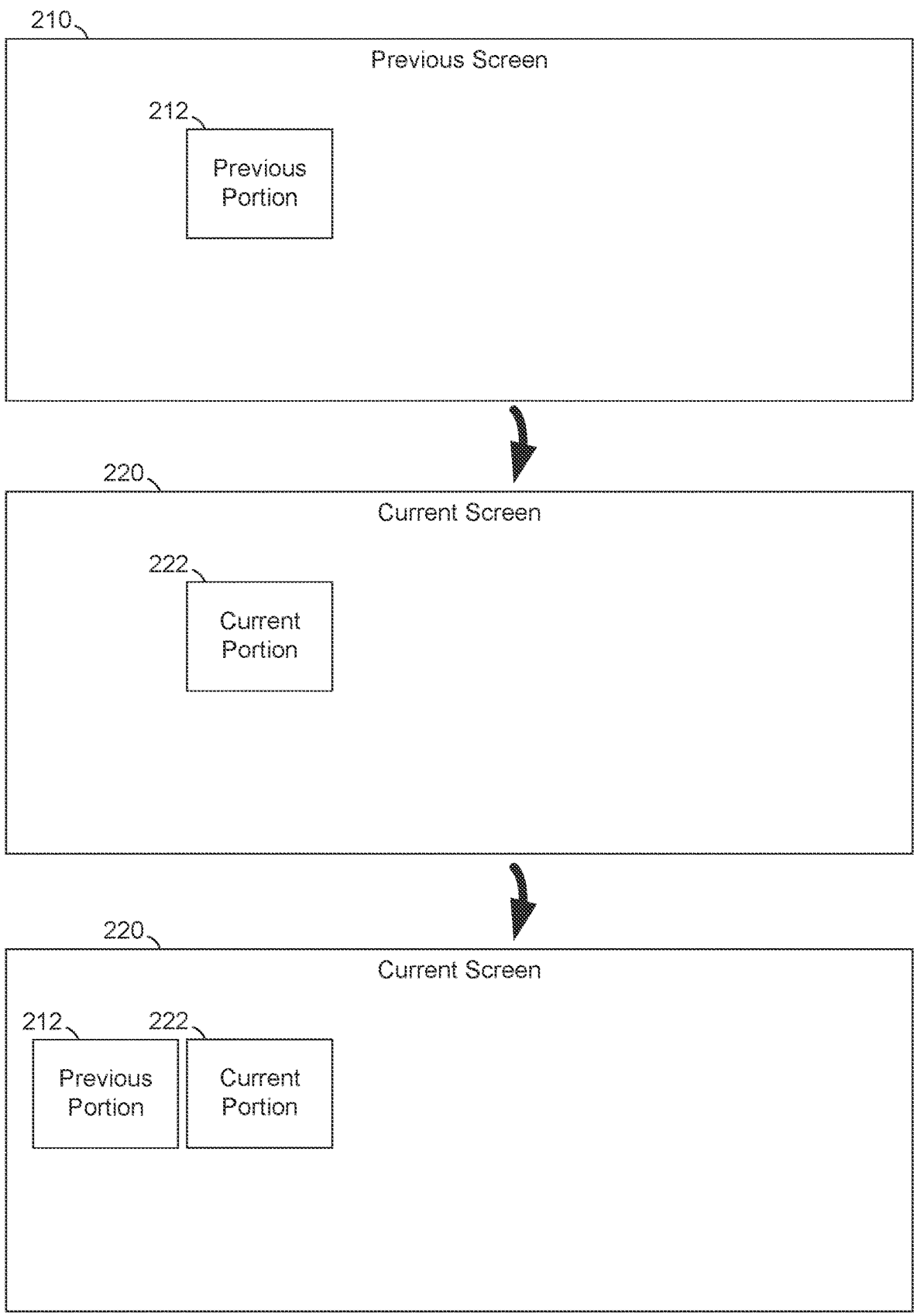

As shown in FIG. 5, the presentation of the previous portion 212 within the current screen 220 may be contemporaneous with the presentation of the current portion 222 within the current screen 220. In some example embodiments, multiple portions that were previously presented (e.g., previous portion 212, plus further previously presented portions of further previously presented screens) are presented alongside the current portion 222 within the current screen 220. This may have the effect of providing a visual comparison of how a sequence of multiple screens (e.g., multiple screens with distinctive portions thereof) looked at different times in the past. That is, some example embodiments may facilitate a location-based display of pixel history, where a user (e.g., user 112 or user 132) may view historically presented pixels (e.g., previously displayed pixels) as they changed over time in the area encompassed by the current portion 222 of the current screen 220.

Figure 6:
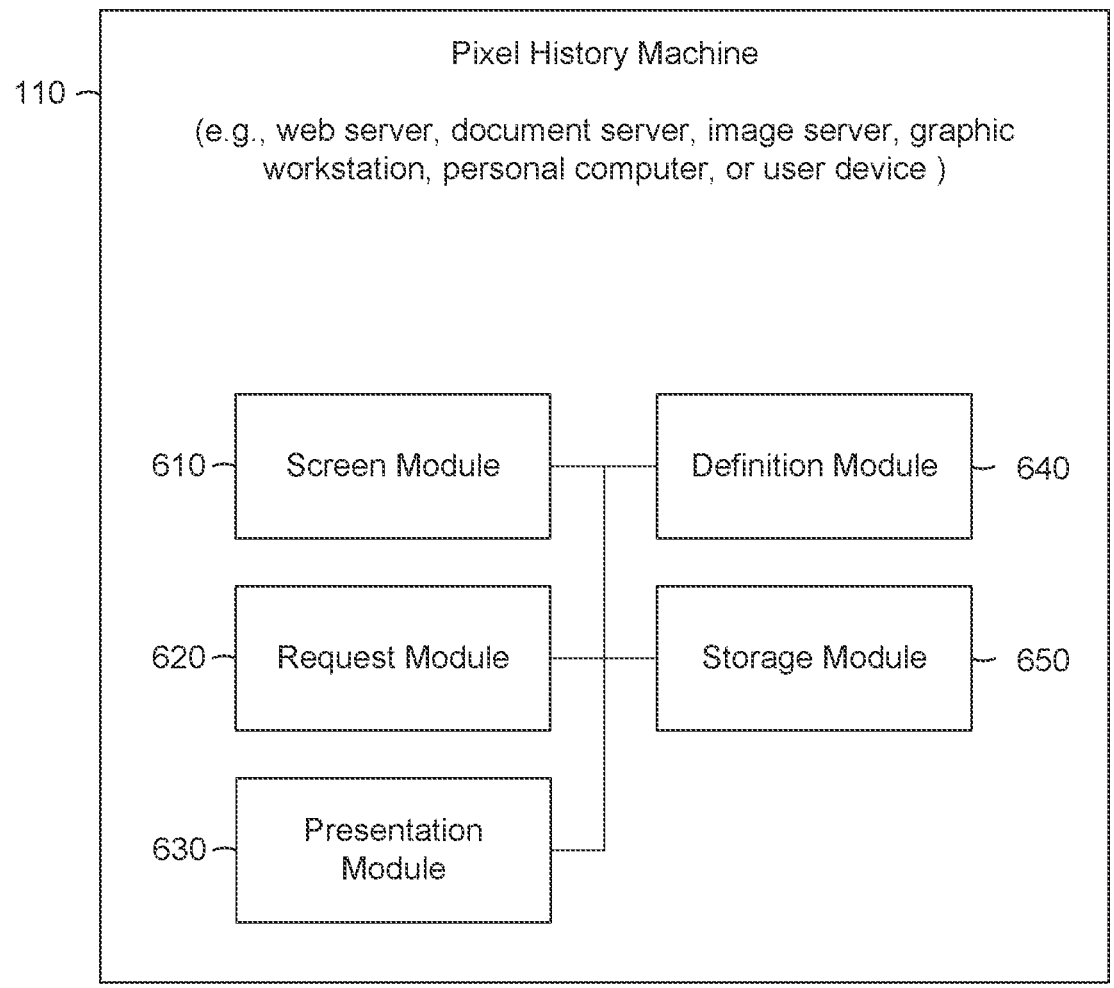
FIG. 6 is a block diagram illustrating components of a pixel history machine suitable for location-based display of pixel history, according to some example embodiments.

FIG. 6 is a block diagram illustrating components of the pixel history machine 110, according to some example embodiments. The pixel history machine 110 is shown as including a screen module 610, a request module 620, a presentation module 630, a definition module 640, and a storage module 650, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules.

The screen module 610 is configured to present one or more screens (e.g., within a sequence of multiple screens) in a sequential manner. For example, the screen module 610 may present the previous screen 210 at a particular point in time (e.g., five minutes ago or five seconds ago) and then present the current screen 220 at a later point in time (e.g., one second ago or now). Accordingly, the current screen 220 may be a screen that is currently being presented by the screen module 610. Accordingly, the screen module 610 may present the previous screen 210 prior to presenting the current screen 220. The presentation of a screen may be performed by communicating (e.g., providing) the screen to a user device (e.g., user device 130) or by displaying the screen. Moreover, a presentation of a screen by the screen module 610 may be modified by the presentation module 630, as described below.

In some example embodiments, the screen module 610 presents the current screen 220, or any portion thereof, by communicating the current screen 220, or any portion thereof, to a user device (e.g., user device 130) of a user (e.g., user 132) to whom the previous screen 210 was presented at some time in the past. In alternative example embodiments, the screen module 610 presents the current screen 220 by directly displaying the current screen 220 on a display that is communicatively coupled (e.g., connected) to the pixel history machine 110, which may be a user device of a user (e.g., user 112) to whom the previous screen 210 was presented in the past.

The request module 620 is configured to receive a request (e.g., a user-submitted request) that the previous portion 212 of the previous screen 210 be presented within the current screen 220, which may be currently presented by the screen module 610. The request may be received as a submission from a user (e.g., user 112 or user 132) to whom the current screen 220 is being presented by the screen module 610. For example, the current screen 220 may be currently presented to the user 132 via the user device 130, and the request may be received from the user device 130 as a submission from the user 132. As another example, the current screen 220 may be currently presented to the user 112 by the pixel history machine 110, and the request may be received by the pixel history machine 110 from the user 112.

The presentation module 630 is configured to present the previous portion 212 of the previous screen 210 within the current screen 220 (e.g., contemporaneously with the current portion 222 of the current screen 220). For example, the presentation module 630 may modify the presentation of the current screen 220, which may be currently presented (e.g., in an on-going manner) by the screen module 610). For example, the presentation module 630 may replace the current portion 222 with the previous portion 212 within the current screen 220. In certain example embodiments, the presentation module 630 adds the previous portion 212 to the current screen 220, overlays the previous portion 212 over the current screen 220, or any suitable combination thereof. The presentation module 630 may present the previous portion 212 in response to the request received by the request module 620.

The definition module 640 is configured to receive a location as a definition of an area for the previous portion 212, for the current portion 222, or for both. In other words, the area may be defined to have boundaries that are coincident with boundaries of the previous portion 212, boundaries of the current portion 222, or boundaries of both. In some example embodiments, the previous portion 212 and the current portion 222 have the same location, the same dimensions, the same corners, the same area, or any suitable combination thereof. Accordingly, the definition module 640 may receive the location as a definition of such an area. This location may form all or part of a basis for location-based display of pixel history (e.g., historically presented pixels within the previous portion 212 of the previous screen 210). Moreover, the location may be received as a submission from a user (e.g., the user to whom the current screen 220 is being presented by the screen module 610). In some example embodiments, the boundaries of the previous portion 212 and the boundaries of the current portion 222 are not the same (e.g., not coincident with each other). In such a case, the definition module 640 may be configured to determine a common subset of pixels enclosed by both sets of boundaries (e.g., an area defining pixel locations that are common to both the previous portion 212 and the current portion 222). In alternative example embodiments, the definition module 640 determines an area enclosed by at least one set of boundaries (e.g., an area defining pixel locations and closed by the previous portion 212, the current portion 222, or both). Accordingly, the definition module 640 may present a user (e.g., user 112 or user 132) with a choice (e.g., via a notification or a widget) to display the previous portion 212, the current portion 222, an area common to both the previous portion 212 and the current portion 222, or an area enclosed by at least one of the previous portion 212 or the current portion 222. In such example embodiments, the screen module 610 may be configured to present whichever area is chosen by the user.

The storage module 650 is configured to store the previous portion 212 of the previous screen 210 in a memory buffer (e.g., a browser cache stored at the user device 130, the pixel history machine 110, or the database 115). The storing of the previous portion 212 may be based on the receiving of the location (e.g., the definition of the area for the previous portion 212 and for the current portion 222) by the definition module 640. Further details of various modules of the pixel history machine 110 are described below with respect to FIG. 7-9.

Figure 7:
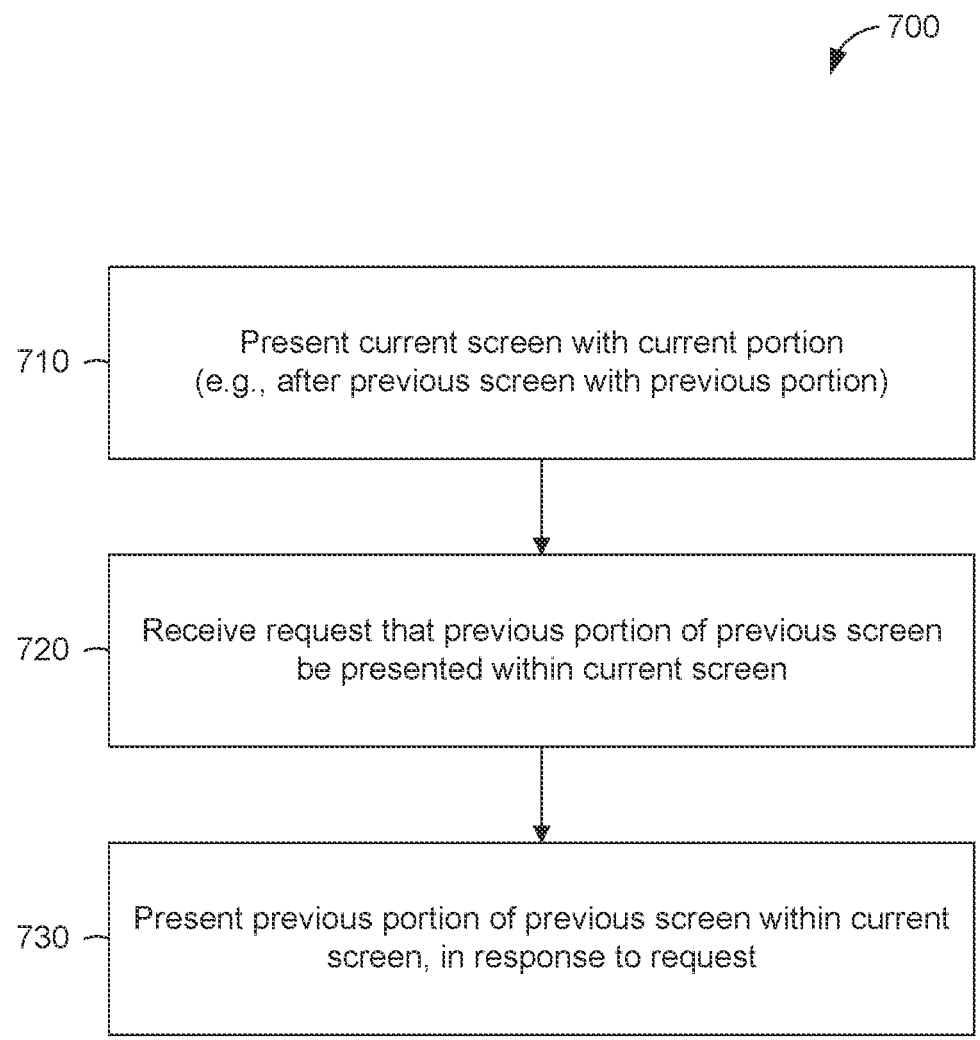
FIG. 7-9 are flowcharts illustrating operations of the pixel history machine in performing a method of location-based display of pixel history, according to some example embodiments.
Figure 8:
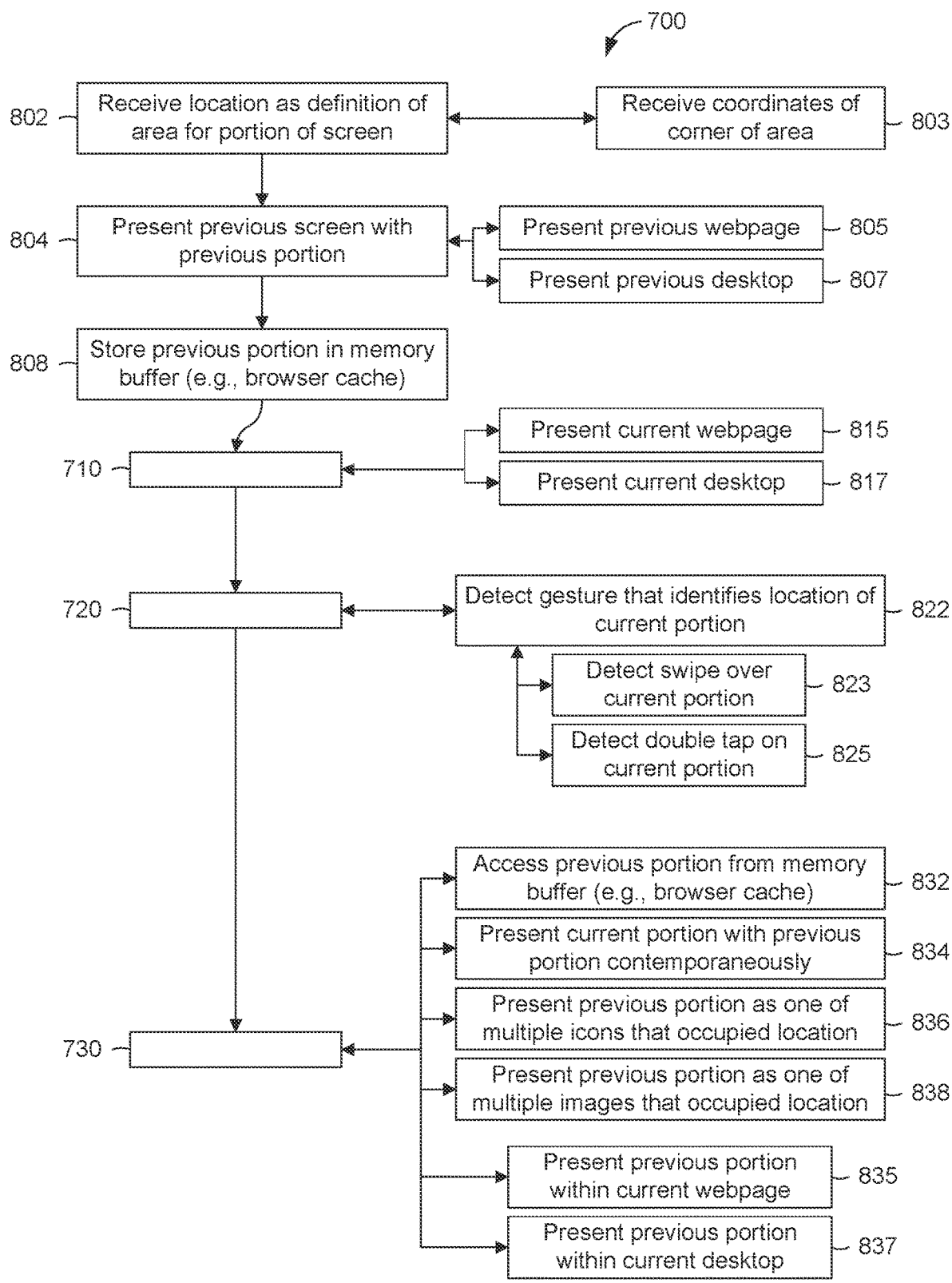
Figure 9:
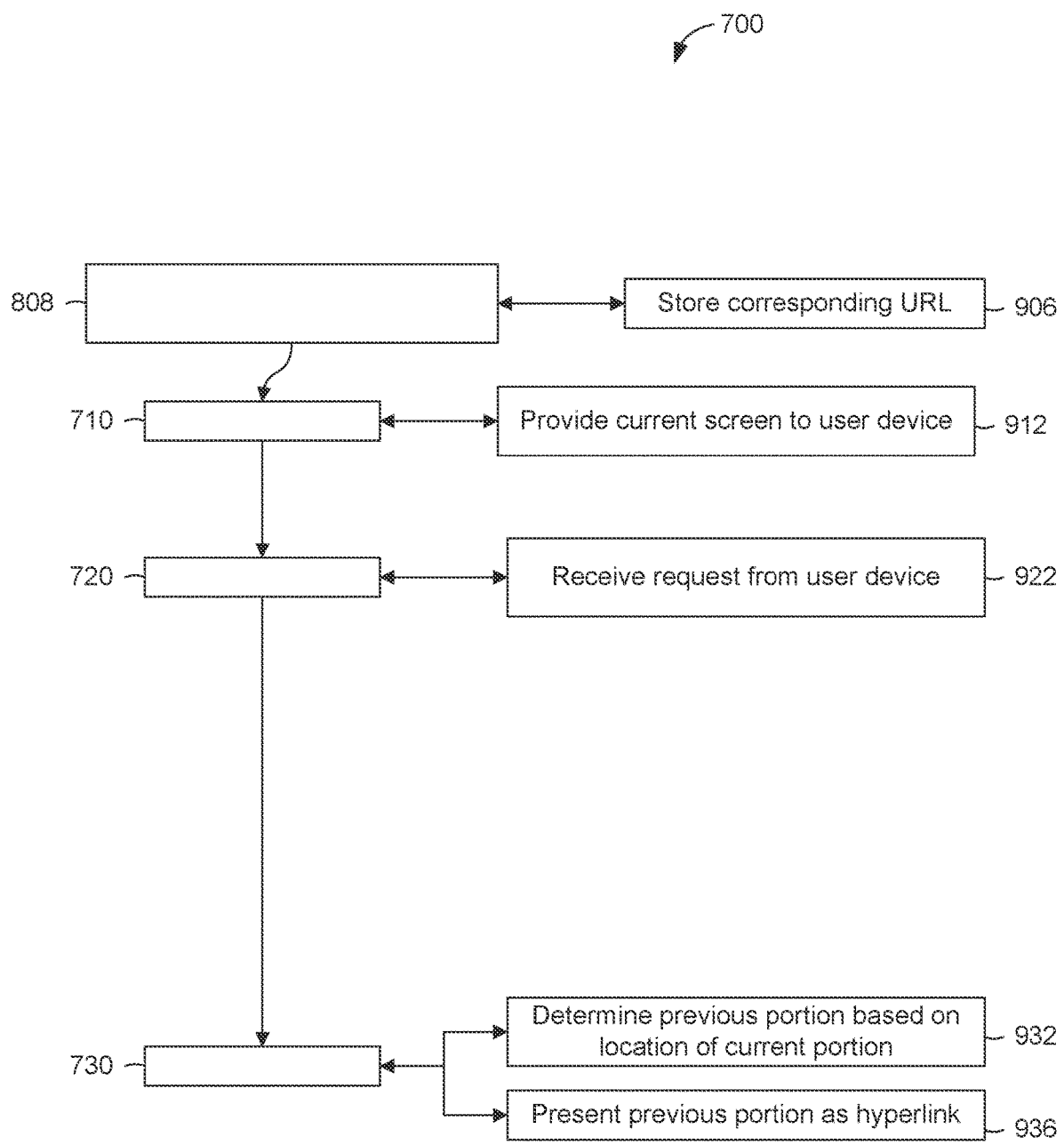

FIG. 7-9 are flowcharts illustrating operations of the pixel history machine 110 in performing a method 700 of location-based display of pixel history, according to some example embodiments. Operations in the method 700 may be performed by the pixel history machine 110, using modules described above with respect to FIG. 6. As noted above, in some example embodiments, the pixel history machine 110 may be a user device (e.g., similar to the user device 130 or the user device 150), which may include modules similar to those described above with respect to FIG. 6. As shown in FIG. 7, the method 700 includes operations 710, 720, and 730.

In operation 710, the screen module 610 presents the current screen 220. For example, the screen module 610 may communicate (e.g., provide) the current screen 220 to the user device 130, for presentation on a display connected or communicatively coupled thereto. As another example, the screen module 610 may display the current screen 220 directly on a display (e.g., a monitor, flat-panel display, or touch screen) that is connected to the pixel history machine 110. Further details of operation 710 are discussed below with respect to FIG. 8-9.

In operation 720, the request module 620 receives a request (e.g., a user-submitted request) that the previous portion 212 of the previous screen 210 be presented within the current screen 220. During operation 710, the current screen 220 may be currently presented by the screen module 610 (e.g., as a result of performing operation 710). Moreover, the request may be received by the request module 620 as a submission from a user (e.g., user 112 or user 132) to whom the current screen 220 is being presented (e.g., by the screen module 610 in the course of performing operation 710). Further details of operation 720 are discussed below with respect to FIG. 8-9.

In operation 730, the presentation module 630 presents the previous portion 212 of the previous screen 210 within the current screen 220. Presentation of the previous portion 212 may be contemporaneous with presentation of the current portion 222 of the current screen 220. Moreover, the presentation of the previous portion 212 may be in response to the request received in operation 720. Further details of operation 730 are discussed below with respect to FIG. 8-9.

As shown in FIG. 8, the method 700 may include one or more of operations 802, 803, 804, 805, 807, 808, 815, 817, 822, 823, 825, 832, 834, 835, 836, 837, and 838. In operation 802, the definition module 640 receives the location of the current portion 222 and of the previous portion 212 (e.g., with respect to the current screen 220 and to the previous screen 210). This location may be received as a definition of an area (e.g., a rectangular area having a pixel width and a pixel height). This area may have boundaries that are coincident with the current portion 222 (e.g., coincident with boundaries of the current portion 222) and that are coincident with the previous portion 212 (e.g., coincident with boundaries of the previous portion 212). Moreover, the location (e.g., the definition of the area) may be received as a submission from a user (e.g., user 112 or user 132) to whom the current screen 220 is being presented and to whom the previous screen 210 was presented in the past (e.g., five minutes ago). According to various example embodiments, the definition of the area may define a column within the previous screen 210 (e.g., as shown in FIG. 4), a row within the previous screen 210 (e.g., as shown in FIG. 3), or a rectangle within the previous screen 210 (e.g., as shown in FIG. 2 and FIG. 5).

According to some example embodiments, performance of operation 802 initiates (e.g., clears or refreshes) a memory buffer within which the previous portion 212 may be stored (e.g., as discussed below with respect to operation 808). This may have the effect of allowing a user (e.g., user 112 or user 132) to define or redefine (e.g., multiple times) the location of the previous portion 212 and of the current portion 222. The reception of the location may cause the pixel history machine 110 to begin storing (e.g., in the memory buffer) portions of screens that appear at the location. Accordingly, a reception of a new location may cause the pixel history machine 110 to begin storing portions of screens that appear at the new location. Thus, certain example embodiments allow the user to create, modify, update, or delete the area that is defined for location-based display of pixel history within each screen among a sequence of multiple screens.

Operation 803 may be performed as part (e.g., a precursor task, a subroutine, or a portion) of operation 802, in which the definition module 640 receives the location of the current portion 222 and of the previous portion 212. In operation 803, the definition module 640 receives coordinates of one or more corners of the area defined by the location received in operation 802. For example, the area may be defined by four corners of a rectangular area, and the coordinates of these corners may be received (e.g., one by one, or all together) in operation 803. As noted above, the area may have boundaries that are coincident with the current portion 222 and coincident with the previous portion 212.

In operation 804, the screen module 610 presents the previous screen 210 with the previous portion 212. This presentation of the previous screen 210 may be performed in a manner similar to that described above with respect to operation 710 (e.g., earlier in time compared to the presenting of the current screen 220 with the current portion 222).

According to some example embodiments, the previous screen 210 is a previous webpage (e.g., a previous document shown within a browser window), and the current screen 220 is a current webpage (e.g., a current document shown within the same browser window). Accordingly, operation 805 may be performed as part (e.g., a precursor task, a subroutine, or a portion) of operation 804; operation 815 may be performed as part of operation 710; and operation 835 may be performed as part of operation 730. More specifically, in the performance of operation 804, the screen module 610 may perform operation 805 by presenting the previous screen 210 as the previous webpage. In the performance of operation 710, the screen module 610 may perform operation 815 by presenting the current screen 220 as the current webpage. In the performance of operation 730, the presentation module 630 may perform operation 835 by presenting the previous portion 212 within the current webpage presented in operation 815.

According to certain example embodiments, the previous screen 210 is a previous desktop (e.g., a previous background with a previous set of icons), and the current screen 220 is a current desktop (e.g., a current background with a current set of icons). Accordingly, operation 807 may be performed as part (e.g., a precursor task, a subroutine, or a portion) of operation 804; operation 817 may be performed as part of operation 710; and operation 837 may be performed as part of operation 730. More specifically, in the performance of operation 804, the screen module 610 may perform operation 807 by presenting the previous screen 210 as the previous desktop. In the performance of operation 710, the screen module 610 may perform operation 817 by presenting the current screen 220 as the current desktop. In the performance of operation 730, the presentation module 630 may perform operation 837 by presenting the previous portion 212 within the current desktop presented in operation 817.

In operation 808, the storage module 650 stores the previous portion 212 in a memory buffer (e.g., a browser cache or other data repository stored at the user device 130, the pixel history machine 110, or the database 115). The storing of the previous portion 212 may be based on (e.g., triggered by or responsive to) the receiving of the location (e.g., the receiving of the definition of the area) for the previous portion 212 in operation 802. This may have the effect of enabling access to the previous portion 212 at a time when the previous screen 210 is no longer being presented (e.g., at a time when the current screen 220 is being presented).

Operation 822 may be performed as part (e.g., a precursor task, a subroutine, or a portion) of operation 720, in which the request module 620 receives the request that the previous portion 212 be presented within the current screen 220. In operation 822, the request module 620 detects a gesture (e.g., a touch-based input, a motion-based input, or any suitable combination thereof) that identifies the location of the current portion 222 of the current screen 220. This location may be the same location received in operation 802. This may have the effect of enabling a user (e.g., user 112 or user 132) to submit the request received in operation 720 via a gesture-based command (e.g., on a touch-sensitive display).

One or more of operations 823 and 825 may be performed as part of operation 822, in which the request module 620 detects the gesture that identifies a location of the current portion 222. In operation 823, the request module 620 detects the gesture as a swipe (e.g., a dragged touch) over the current portion 222 of the current screen 220 or any part thereof. In operation 825, the request module 620 detects the gesture as a number of taps (e.g., a double tap) on at least part of the current portion 222 of the current screen 220. In some example embodiments, the request module 620 performs operation 825 by detecting a number of clicks (e.g., a double click) on at least part of the current portion 222.

One or more of operations 832, 834, 836, and 838 may be performed as part (e.g., a precursor task, a subroutine, or a portion) of operation 730, in which the presentation module 630 presents the previous portion 212 within the current screen 220. In operation 832, the presentation module 630 accesses the previous portion 212 from a memory buffer (e.g., the memory buffer used in operation 808 to store the previous portion 212). In some example embodiments, operation 832 may include accessing the previous screen 210 (e.g., in its entirety), or any one or more portions thereof, from the memory buffer. As noted above, this memory buffer may be a browser cache or other data repository (e.g., stored at the user device 130, the pixel history machine 110, or the database 115). This may have the effect of retrieving the previous portion 212 from the memory buffer (e.g., from the browser cache).

In operation 834, the presentation module 630 presents the previous portion 212 of the previous screen 210 by presenting the current portion 222 of the current screen 220 contemporaneously (e.g., simultaneously, in parallel, in tandem, or any suitable combination thereof) with the previous portion 212 of the previous screen 210. An example of such a presentation is shown in FIG. 5 and discussed above with respect to FIG. 5.

According to some example embodiments, the previous portion 212 of the previous screen 210 depicts a set of one or more icons (e.g., within a desktop that includes a background and the set of icons). In cases where the previous portion 212 of the previous screen 210 depicts a particular single icon, the current portion 222 of the current screen 220 may depict a different single icon. Hence, the location of the previous portion 212 and of the current portion 222 may be occupied by a sequence of multiple icons that were presented one by one over a period of time. In operation 836, the presentation module 630 presents the previous portion 212 of the previous screen 210 as one icon among the multiple icons that occupied the location in the past.

According to certain example embodiments, the previous portion 212 of the previous screen 210 depicts a set of one or more images (e.g., a picture within a webpage displayed in a browser window). In cases where the previous portion 212 of the previous screen 210 depicts a particular single image, the current portion 222 of the current screen 220 may depict a different single image. Hence, the location of the previous portion 212 and of the current portion 222 may be occupied by a sequence of multiple images that were presented one by one over a period of time. In operation 838, the presentation module 630 presents the previous portion 212 of the previous screen 210 as one image among multiple images that occupied the location in the past.

As shown in FIG. 9, the method 700 may include one or more of operations 906, 912, 922, 932, and 936. Operation 906 may be performed as part (e.g., a precursor task, a subroutine, or a portion) of operation 808, in which the storage module 650 stores the previous portion 212 in a memory buffer. According to various example embodiments, the previous portion 212 of the previous screen 210 is a hyperlink that corresponds to a locator of information (e.g., a uniform resource locator (URL)). That is, the hyperlink may be operable to make a request for information that is locatable by the corresponding URL. For example, the previous screen 210 may be a webpage, and the previous portion 212 of the previous screen 210 may be a hyperlink that links the web page with a further webpage. In operation 906, the storage module 650 stores a URL that corresponds to the previous portion 212 of the previous screen 210. The URL may be stored with the previous portion 212 in the memory buffer (e.g., browser cache). Moreover, this URL may be later used in the presenting of the previous portion 212 within the current screen 220 in accordance with operation 730.

Operation 912 may be performed as part (e.g., a precursor task, a subroutine, or a portion) of operation 710, in which the screen module 610 presents the current screen 220. In operation 912, the screen module 610 provides the current screen 220 to a user device (e.g., user device 130) of a user (e.g., user 132) to whom the previous screen 210 was presented.

Operation 922 may be performed as part (e.g., a precursor task, a subroutine, or a portion) of operation 720, in which the request module 620 receives the request that the previous portion 212 be presented within the current screen 220. In operation 922, the request module 620 receives the request from the user device discussed above with respect to operation 912. In other words, the request module 620 may receive a request from the user device (e.g., user device 130) of the user (e.g., user 132) to whom the previous screen 210 was presented. This may have the effect of allowing the user to request a retrieval of the previous portion 212 of the previous screen 210 (e.g., so that the previous portion 212 may be compared with the current portion 222).

One or more of operations 932 and 936 may be performed as part (e.g., a precursor task, a subroutine, or a portion) of operation 730, in which the presentation module 630 presents the previous portion 212 of the previous screen 210 within the current screen 220. In operation 932, the presentation module 630 determines the previous portion 212. For example, the presentation module 630 may determine the corners, dimensions, boundaries, area, or any suitable combination thereof, of the previous portion 212. This determination may be made based on the location of the current portion 222 within the current screen 220. As noted above, the current portion 222 and the previous portion 212 may share the same location, same corners, same dimensions, same boundaries, same area (e.g., same pixel width and same pixel height), same number of pixels, or any suitable combination thereof.

In operation 936, the presentation module 630 presents the previous portion 212 of the previous screen 210 as a hyperlink that is operable to make a request (e.g., a further and separate request, in comparison to the request received in operation 720) for information that is locatable by the URL stored in operation 906.

According to various example embodiments, one or more of the methodologies described herein may facilitate the presentation of a pixel history (e.g., pixels previously presented), based on the location of pixels. Moreover, one or more of the methodologies described herein may facilitate recall or retrieval of previously displayed pixels (e.g., in the form of one or more icons, one or more images, one or more rows, one or more columns, one or more rectangular areas, or any suitable combination thereof) for a user to whom the pixels were previously displayed. Hence, one or more of the methodologies described herein may facilitate comparison of previously displayed pixels with currently displayed pixels. In addition, previously displayed pixels may be presented as a hyperlink, which may have the effect of facilitating operation of a previously presented hyperlink (e.g., in comparison with operation of a currently presented hyperlink).

When these effects are considered in aggregate, one or more of the methodologies described herein may obviate a need for certain efforts or resources that otherwise would be involved in recalling, retrieving, or operating previously presented pixels, hyperlinks, or any suitable combination thereof. Efforts expended by a user in performing these tasks may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 10:
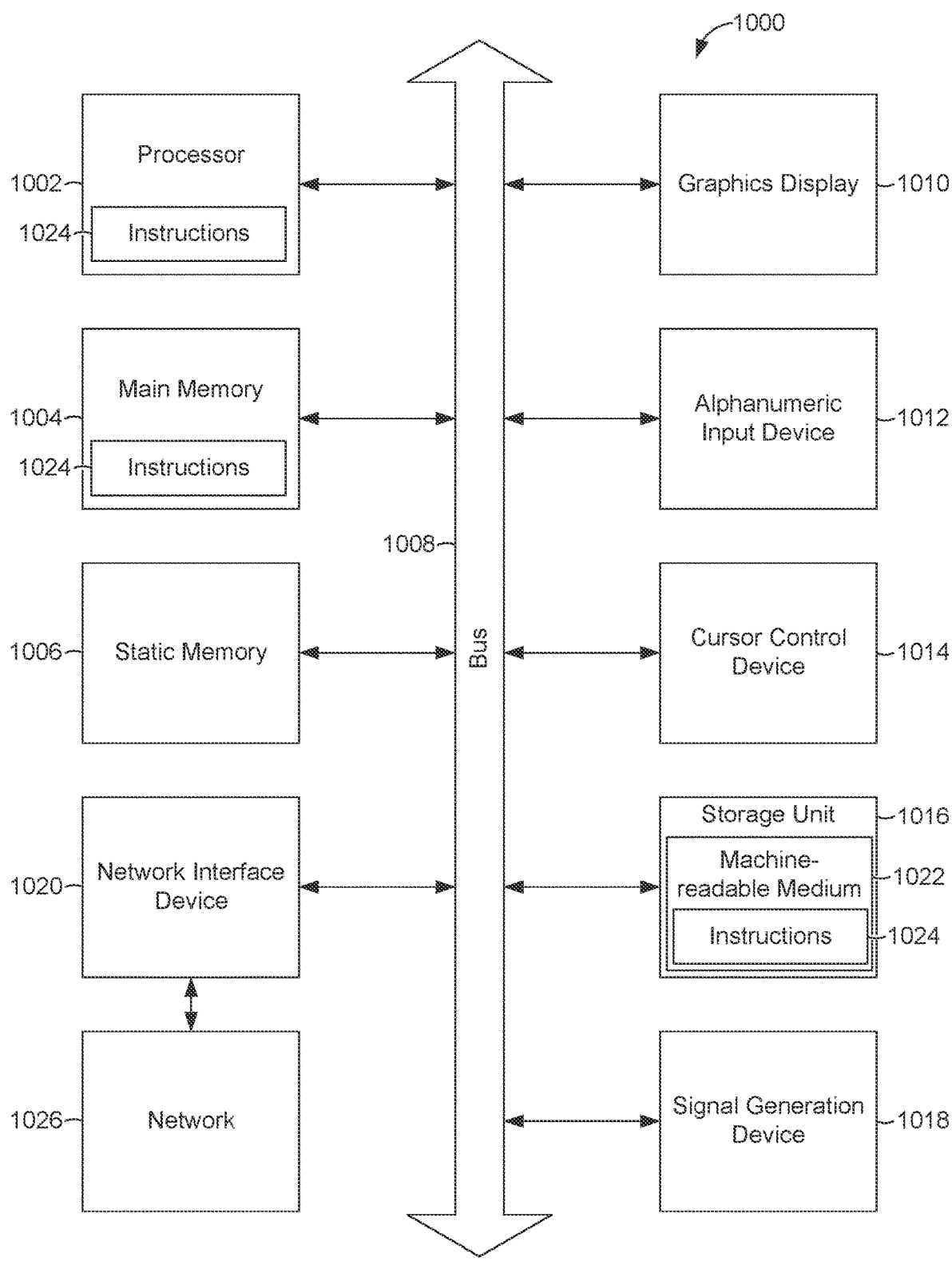
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system and within which instructions 1024 (e.g., software) for causing the machine 1000 to perform any one or more of the methodologies discussed herein may be executed. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a peer-to-peer (or distributed) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include a collection of machines that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a graphics display 1010 (e.g., a plasma display panel (PDP), a light emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 includes a machine-readable medium 1022 on which is stored the instructions 1024 (e.g., software) embodying any one or more of the methodologies or functions described herein. The instructions 1024 may also reside, completely or at least partially, within the main memory 1004, within the processor 1002 (e.g., within the processor's cache memory), or both, during execution thereof by the machine 1000. Accordingly, the main memory 1004 and the processor 1002 may be considered as machine-readable media. The instructions 1024 may be transmitted or received over a network 1026 (e.g., network 190) via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 1000), such that the instructions, when executed by one or more processors of the machine (e.g., processor 1002), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   presenting, on a display of a user device, a first screen that includes a first element occupying less than an entirety of the first screen;
   presenting, on the display of the user device, a second screen that includes a second element occupying less than an entirety of the second screen;
   receiving, by the user device, an input at the second screen that defines a portion of the second screen including the second element and requests that content previously presented in the defined portion be presented together with the second element to enable comparison of the content previously presented in the defined portion and the second element;
   identifying, by the user device, that the defined portion corresponds to a portion of the first screen that displayed the first element during presentation of the first screen; and
   outputting, on the display of the user device, a view of the first element contemporaneously with a view of the second element within the second screen.

2. The method of claim 1, further comprising:
   identifying a first plurality of pixels of the display of the user device that were used to display the first element; and
   identifying a second plurality of pixels of the display of the user device included in the defined portion of the second screen, wherein identifying that the defined portion corresponds to the portion of the first screen that displayed the first element during presentation of the first screen is performed responsive to determining that the first plurality of pixels and the second plurality of pixels include at least one common pixel of the display of the user device.

3. The method of claim 2, further comprising storing information describing the first plurality of pixels in a cache at the user device responsive to presenting the first screen.

4. The method of claim 2, further comprising storing information describing the first plurality of pixels as a uniform resource locator (URL) that is operable to retrieve the view of the first element.

5. The method of claim 1, wherein outputting the view of the first element contemporaneously with the view of the second element comprises outputting an overlay over the second screen.

6. The method of claim 1, wherein presenting the second screen comprises ceasing display of the first screen and refreshing the display of the user device with the second screen.

7. The method of claim 1, wherein the first element comprises an image and the second element comprises a different image.

8. A system comprising:
   one or more processors; and
   a computer-readable storage medium storing instructions that are executable by the one or more processors to perform operations comprising:
      presenting, on a display of a user device, a first screen that includes a first element occupying less than an entirety of the first screen;
      presenting, on the display of the user device, a second screen that includes a second element occupying less than an entirety of the second screen;
      receiving an input at the second screen that defines a portion of the second screen including the second element and requests that content previously presented in the defined portion be presented together with the second element to enable comparison of the content previously presented in the defined portion and the second element;
      identifying that the defined portion corresponds to a portion of the first screen that displayed the first element during presentation of the first screen; and
      outputting, on the display of the user device, a view of the first element contemporaneously with a view of the second element within the second screen.

9. The system of claim 8, further comprising:
   identifying a first plurality of pixels of the display of the user device that were used to display the first element; and
   identifying a second plurality of pixels of the display of the user device included in the defined portion of the second screen, wherein identifying that the defined portion corresponds to the portion of the first screen that displayed the first element during presentation of the first screen is performed responsive to determining that the first plurality of pixels and the second plurality of pixels include at least one common pixel of the display of the user device.

10. The system of claim 9, further comprising storing information describing the first plurality of pixels in a cache at the user device responsive to presenting the first screen.

11. The system of claim 9, further comprising storing information describing the first plurality of pixels as a uniform resource locator (URL) that is operable to retrieve the view of the first element.

12. The system of claim 8, wherein outputting the view of the first element contemporaneously with the view of the second element comprises outputting an overlay over the second screen.

13. The system of claim 8, wherein presenting the second screen comprises ceasing display of the first screen and refreshing the display of the user device with the second screen.

14. The system of claim 8, wherein the first element comprises an image displayed on a first web page and the second element comprises a second image displayed on a second web page.

15. A method comprising:
presenting, on a display of a user device, a first user interface that includes a first element occupying less than an entirety of the first user interface;
presenting, on the display of the user device, a second user interface that includes a second element occupying less than an entirety of the second user interface;
receiving, by the user device, an input at the second user interface that defines a portion of the second user interface including the second element and requests that content previously presented in the defined portion be presented together with the second element to enable comparison of the content previously presented in the defined portion and the second element;
identifying, by the user device, that the defined portion corresponds to a portion of the first user interface that displayed the first element during presentation of the first user interface; and
outputting, on the display of the user device, a view of the first element contemporaneously with a view of the second element within the second user interface.

16. The method of claim 15, further comprising:
identifying a first plurality of pixels of the display of the user device that were used to display the first element; and
identifying a second plurality of pixels of the display of the user device included in the defined portion of the second user interface, wherein identifying that the defined portion corresponds to a portion of the first user interface that displayed the first element during presentation of the first user interface is performed responsive to determining that the first plurality of pixels and the second plurality of pixels include at least one common pixel of the display of the user device.

17. The method of claim 16, further comprising storing information describing the first plurality of pixels in a cache at the user device responsive to presenting the first user interface.

18. The method of claim 16, further comprising storing information describing the first plurality of pixels as a uniform resource locator (URL) that is operable to retrieve the view of the first element.

19. The method of claim 15, wherein outputting the view of the first element contemporaneously with the view of the second element comprises outputting an overlay over the second user interface.

20. The method of claim 16, wherein presenting the second user interface comprises ceasing display of the first user interface and refreshing the display of the user device with the second user interface.

* * * * *